United States Patent [19]

Thies

[11] 4,157,969
[45] Jun. 12, 1979

[54] SETTLING TANK STRUCTURE
[75] Inventor: Howard J. Thies, Houston, Tex.
[73] Assignee: Texaco Inc., New York, N.Y.
[21] Appl. No.: 865,543
[22] Filed: Dec. 29, 1977
[51] Int. Cl.² .............................................. B01D 17/04
[52] U.S. Cl. ..................................... 210/521; 210/83; 210/DIG. 26
[58] Field of Search .................... 210/73 R, 73 W, 83, 210/84, 286, 320, 521, 522, DIG. 25, DIG. 26

[56] References Cited

U.S. PATENT DOCUMENTS

| 1,217,397 | 2/1917 | Boland | 210/73 R |
|---|---|---|---|
| 2,288,333 | 6/1942 | Vinson | 210/73 W |

*Primary Examiner*—Frank Sever
*Attorney, Agent, or Firm*—Thomas H. Whaley; Carl G. Ries; Henry C. Dearborn

[57] ABSTRACT

Improved structure for a settling tank to be used for oil-water separation. It has a reduced height and greatly increased length for a given volume. Also, there are baffles across the width to create a piston-like displacement of the mixture as it moves from the inlet end to the outlet end. The inlet for the mixture is near the top at one end, and the outlet is near the bottom at the other end. The outlet for oil is at the outlet end and higher than the mixture inlet.

1 Claim, 7 Drawing Figures

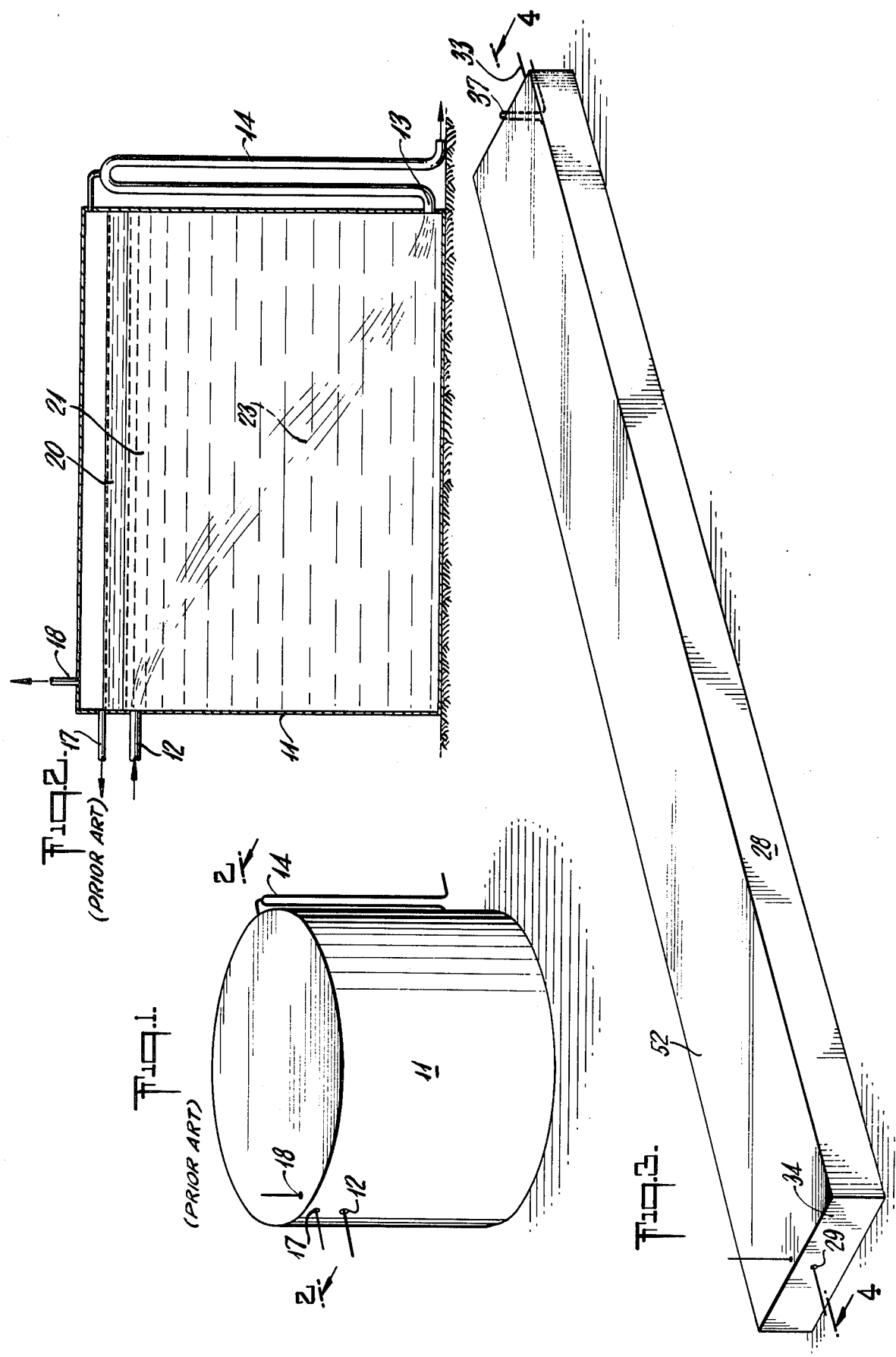

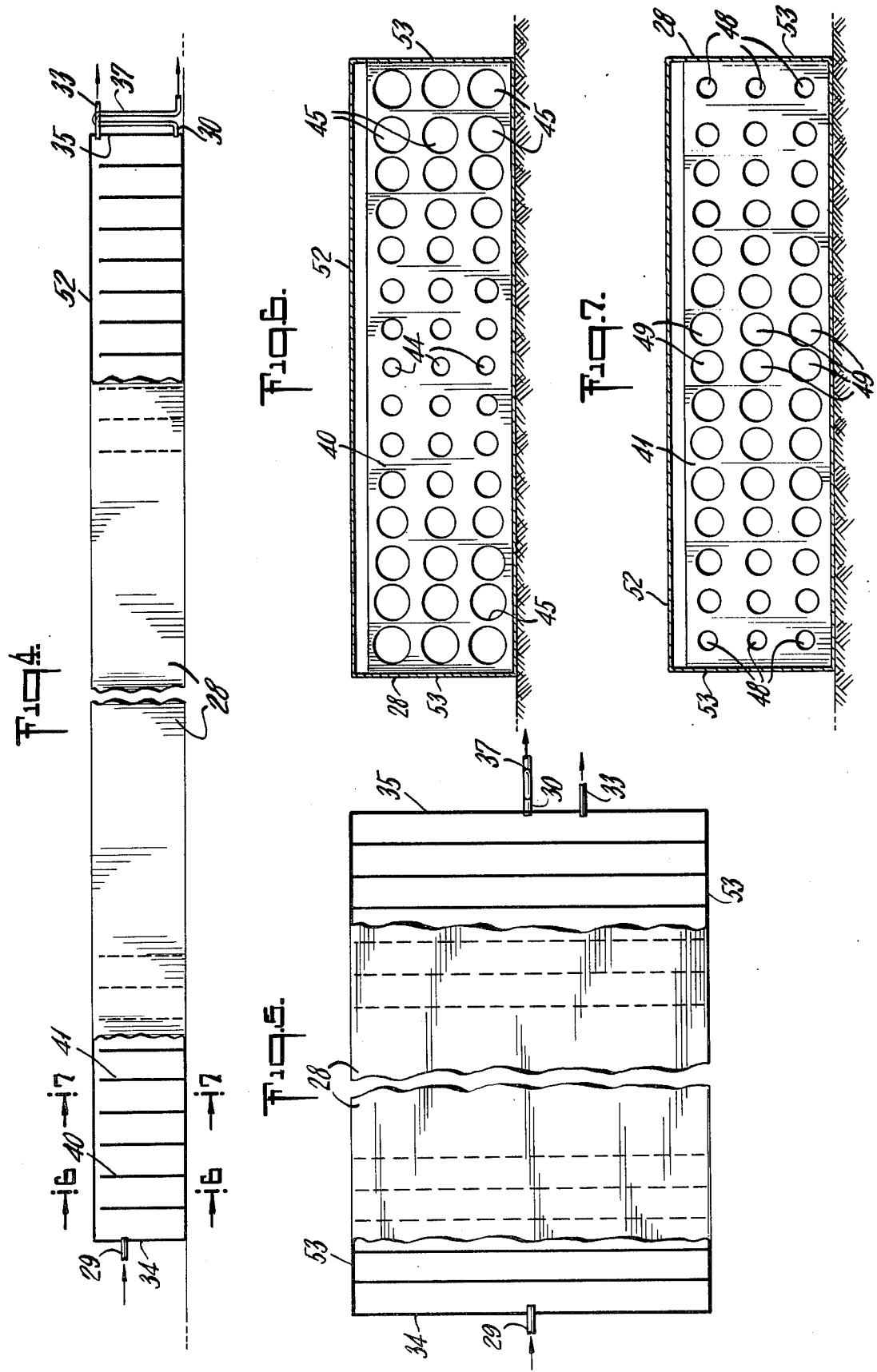

SETTLING TANK STRUCTURE

BACKGROUND OF THE INVENTION

1. Field of the Invention

This invention concerns settling tanks in general. More specifically it concerns an improved settling tank structure, for use in oil and water mixtures.

2. Description of the Prior Art

Heretofor, settling tanks for separating oil from water, particularly where there has been some emulsion formed, have merely involved a rather large sized tank for making a separation by settling therein. A standard 1000 barrel settling tank has a dimension of approximately 16 feet high and is about 21 feet 7 inches in diameter. The inlet for introducing a mixture of liquids, is located on one side near the top. An outlet for the settled liquid (which is suppose to be all water) is located on the other side of the tank near the bottom. Also there is a water leg, or inverted U-tube connected to the outlet and extending up near the top of the tank. This is for maintaining a static fluid level in the tank. There is usually an outlet for the settled-out oil near the top and above the inlet on the same side as the inlet. If the tank is covered, there is, of course, an outlet for gas.

It has been found that separation in such a settling tank is not very efficient, and much emulsion with oil in the mixture is retained and flows out the outlet.

There is a prior U.S. Pat. No. 1,217,397 issued Feb. 27, 1917, which deals with filtering of water containing precious metals in order to recover such precious metals. It discloses a tank with partitions, and the water containing the metals is circulated therethrough. But, the water is kept moving at a sufficient rate to retain the metal particles in the fluid stream all the way through the tank and out the exit end thereof.

There is also a prior U.S. Pat. No. 2,288,333 to D. W. Vinson issued June 30, 1942. However, it discloses a special type of settling tank which while it has partitions, includes an open space along the bottoms of such partitions. Also, the alternate partitions are attached to one of the walls so that the field circulates through in an S-shaped stream above the bottom open portions.

It is an object of this invention to provide a settling tank structure that is improved over the prior known structures. The improvement is such as to create a substantially complete separation during the settling process, as fluid is translated through the settling tank.

SUMMARY OF THE INVENTION

Briefly, the invention concerns a settling tank structure for oil and water mixtures. It comprises an elongated tank having an inlet for said mixture at one end and a first outlet for said water at the other end. The walls of said tank have a predetermined height for holding a predetermined quantity of said mixture for settling and the said first outlet includes means for maintaining static liquid level in said tank at a predetermined height therein. The said inlet is located near the top of said wall height, and said first outlet is located near the bottom of said wall height. It also comprises a second outlet for oil located above said inlet near the top of said wall height, and baffle means for maintaining piston-like displacement of said oil and water mixture from said one end to the other.

Again briefly, the invention concerns a settling tank structure for oil and water mixtures. It comprises an elongated tank having an inlet for said mixture at one end and a first outlet for said water at the other end. The walls of said tank have a predetermined short height for holding a predetermined quantity of said mixture for settling. The said wall height is short enough to minimize the vertical migration distance of minute oil particles, and the said first outlet includes means for maintaining static liquid level in said tank at a predetermined height therein. Said inlet is located near the top of said wall height, and said first outlet is located near the bottom of said wall height. A second outlet for oil is located at said one end and above said inlet near the top of said wall height. And, it comprises baffle means for maintaining piston-like displacement of said oil and water mixture from said one end to the other. The baffle means comprises a plurality of impervious panels extending transversely completely across said tank, and extending from the bottom up to said predetermined height. Alternative ones of said panels have apertures for restricting fluid flow therethrough near the center more than near the ends. The baffle means also comprises the remainder of said panels having apertures for restricting fluid flow therethrough near the ends more than near the centers. The said tank has a length to wall height radio of 25, and said wall height is about 4 feet.

Once more briefly, the invention concerns a settling tank structure for oil and water mixtures. It comprises an elongated tank having an inlet for said mixture at one end and a first outlet for water at the other end. The walls of said tank have a predetermined short height for holding a predetermined quantity of said mixture while minimizing the vertical distance for migration of minute oil particles. The said first outlet includes means for maintaining static liquid level in said tank at a predetermined height therein, and said inlet is located near the top of said wall height. The said first outlet is located near the bottom of said wall height, and a second outlet for oil is located at said one end and above said inlet near the top of said wall height. The said tank has a length to wall height ratio of about 25.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a perspective schematic showing a settling tank according to the prior art;

FIG. 2 is a longitudinal cross section, some what enlarged, of the prior art tank taken along the line 2—2 in FIG. 1;

FIG. 3 is a perspective schematic, showing a settling tank in accordance with the invention;

FIG. 4 is a somewhat enlarged side elevation, broken away in cross section near the ends, and showing the tank illustrated in FIG. 3 with the cross section portions taken along the lines 4—4 of FIG. 3;

FIG. 5 is a somewhat enlarged plan view showing the ends of the tank illustrated in FIGS. 3 and 4 with the top partially broken away;

FIG. 6 is a further enlarged transverse cross sectional view taken along the lines 6—6 of FIG. 4; and FIG. 7 is another further enlarged transverse cross-sectional view, this taken along the lines 7—7 of FIG. 4.

DESCRIPTION OF THE PREFERRED EMBODIMENT

Settling tanks that are in use today have changed very little from what they were 20 years ago. Under today's conditions the costs of petroleum and related products are sufficiently high, and in addition the environmental costs and restrictions are sufficiently great, that a more efficient settling tank is needed. A common structure for a conventional settling tank is for example, one for holding about 1000 barrels of liquid and the tank dimensions are about 16 feet high and 21 feet 7 inches in diameter. It has a high inlet and low outlet with the outlet including a water leg attached to it so that the liquid level inside the tank, under static conditions, is maintained nearly full. The principle of operation is, of course, the settling time which permits gravity release of oil in emulsion, from a water and oil mixture. The longer the time the better the water and oil separation will be.

Two major problems with the foregoing conventional settling tank design are related to channeling, and to gravity migration of the minute oil particles. Tests have shown that there is sufficient channeling in a 1000 barrel settling tank, where the flow rate of liquid through the tank is at 3000 barrels a day, that a barrel of emulsion entering the inlet required only 20 minutes to reach the outlet. On the other hand, if the flow through the tank had been in accordance with piston displacement characteristics, the time for such barrel of input to reach the outlet should have been 8 hours, instead of 20 minutes. Clearly, such a short time does not permit complete separation, and much of the fluid containing minute oil particles is being carried out the outlet with the water.

The second problem relates to the migration of minute oil particles in the settling tank, by reason of the difference in the specific gravities between the oil and the water. While the mixture is flowing from top to bottom in the tank, the oil particle migration is in the opposite direction both upward as well as back toward the inlet end. But, since the mixture including emulsion is tending to carry the minute particles along with it, they are prevented from migrating upward and thus separating out. Furthermore, since the height of the settling tank is about 16 feet, there is a long distance of vertical travel for the minute particles to migrate.

FIGS. 1 and 2 illustrate the prior art, which consists of settling tank 11 that has an inlet 12 for introducing the emulsion and/or oil-water mixture. At the opposite said of the tank 11, there is an outlet 13 that has a water-leg loop 14 connected to it, for maintaining the static liquid level in the tank 11 near the top of the tank. Also, there is an oil outlet 17 located above the inlet 12, and an outlet 18 for any gas which may gather above the liquid in the tank 11.

The FIG. 2 illustration shows a layer of oil 20 on top of the water-and-oil mixture 21 in the tank. And, it has been found, as indicated above, that there tends to be a channeling of the oil-and-water mixture and/or emulsion from the inlet 12 to the outlet 13. This is indicated by the dashed line showing of a path of flow 23. This illustrates ones of the basic reasons whey the settling tank according to the prior art, is deficient. Another reason is the relative height of the tank, which for the indicated 1000 barrels is about 16 feet (the diameter of the tank is about 22 feet). Thus, particularly with the channeling effect that creates the path 23, the minute oil particles near the end of such flow, i.e. close to the outlet 13, must migrate vertically for most of the 16 foot height of the tank.

FIGS. 3-7 illustrate a settling tank according to this invention. There is a tank 28 that is much elongated compared to the prior art. It has an inlet 29 near the top of one end, and an outlet 30 near the bottom at the other end. In additon, there is a second outlet 33 for removing the separated oil. It is located at the same end as the outlet 30, but higher than the inlet 29 which is located in an end wall 34 of the tank 28. Outlets 30 and 33 are located in an end wall 35.

The outlet 30 has an inverted U-tube 37 that acts as means for maintaining the static liquid level in the tank 28 at a predetermined height near the top thereof.

In order to ensure that the oil and water mixture passes through the tank 28 in as near a piston-like displacement from the one end to other, there are baffle means in the tank. Such baffle means are alternately made up of impervious material panels 40 like those illustrated in FIG. 6, and panels 41 like those illustrated in FIG. 7.

It will be observed that the panels 40 have small apertures 44 located near the center of each. Also, there are successively larger apertures 45 extending out to the edges of the panel 40. Consequently, the fluid flow through the panel 40 is restricted near the center much more than near the ends.

In an inverse manner, the panels 41 have small apertures 48 near the ends of the panels, and increasely larger apertures 49 toward the center. Thus, in the case of the panels 41 the flow is restricted near the ends more than near the center.

It will be observed that in the case of the prior art settling tank 11, its dimensions for holding 1000 barrels are (as indicated above) about 22 feet in diameter and 16 feet high. On the other hand, a settling tank according to this invention which holds the same 1000 barrels is only 4 feet high and 15 feet wide while it is 100 feet long. Thus, as pointed out above, the advantage of having a short vertical distance for travel of the minute oil particles in migration toward the oil layer, is quite small. Also, the time of residence in the tank of the mixed fluids, is a very substantial amount greater than the time of such fluids in the prior art tank whether or not there are any baffles.

It may be noted that while the tank 28 is illustrated with a top 52 that is integral with the ends 34, 35 and side walls 53, it will be appreciated that the top may be constructed so as to be removable. And, the panels 40 and 41 may also be constructed so as to be removable. With such construction there is an added benefit to a settling tank according to this invention. Namely, by removal of the top 52 and a number of the panels 40 and 41 there will be sufficient room for cleaning out the tank by removing sand and silt. Thus, it becomes a simple operation. For example, after removing a few of the cover plates which may make up the top 52, and a corresponding number of the panels 40 and 41, a back hoe may be used to remove the sand and silt without shutting down the settling tank operation at all. Heretofore, the prior art type of settling tank required draining for removal of sand and silt, with a much more difficult operation which included shutting down the operation of the settling tank.

It will also be clear, that in the preferred embodiment of this invention, the elongated settling tank has a length to wall-height, ratio of 25. This is in contrast to the corresponding ratio of glass than 2, for a prior art tank containing the same volume. Of course, such an improved ratio greatly increases the length of time of residence of the fluids in the tank, and at the same time there is the other benefit of a shorter vertical distance for migration of the minute oil particles as the separation takes place.

While a particular embodiment of the invention has been described above in considerable detail, in accordance with the applicable statutes, this is not to be taken as in any way limiting the invention but merely as being descriptive thereof.

I claim:

1. Settling tank structure for oil and water mixtures, comprising an elongated tank having an inlet for said mixture at one end and a first outlet for said water at the other end, the walls of said tank having a predetermined short height for holding a predetermined quantity of said mixture for settling, said wall height being short enough to minimize the vertical migration distance of minute oil particles, said first outlet including means for maintaining static liquid level in said tank at a predetermined height therein, said inlet being located near the top of said wall height, said first outlet being located near the bottom of said wall height, a second outlet for oil located at said other end and above said inlet near the top of said wall height, and baffle means for avoiding channeling of said oil and water mixture from said one end to the other, comprising at least two parallel adjacent panels oriented transversely to the flow of said oil and water mixture and extending transversely completely across said tank and from the bottom up to said predetermined height, the first of said panels having rows of appertures which have diameters that decrease from the ends of said panel at the side walls of said tank toward the center thereof for restricting fluid flow through said panel near the center more than near the ends, the second of said panels having rows of apertures which have diameters that increase from the ends of said panel at the side walls of said tank toward the center thereof for restricting fluid flow through said panel near the ends more than near the center, said tank having a length to wall height ratio of about twenty-five, and said wall height being about four feet.

* * * * *